April 14, 1964 W. F. CORMIER 3,129,379
D.C. TO A.C. CONVERTER
Filed Feb. 28, 1962

INVENTOR.
WILLIAM F. CORMIER
BY Arthur H. Swanson
ATTORNEY.

United States Patent Office 3,129,379
Patented Apr. 14, 1964

3,129,379

D.C. TO A.C. CONVERTER

William F. Cormier, Middletown, R.I., assignor to Minneapolis-Honeywell Regulator Company, Minneapolis, Minn., a corporation of Delaware Filed Feb. 28, 1962, Ser. No. 176,323
4 Claims. (Cl. 323—22)

This invention relates to electronic apparatus. More specifically, the present invention relates to electronic signal modulators.

An object of the present invention is to provide an improved signal modulator featuring a transistorized modulating circuit.

Another object of the present invention is to provide an improved signal modulator for converting a direct-current input signal to a proportional alternating-current output signal.

A further object of the present invention is to provide a signal modulator having a simple operation and construction.

In accomplishing these and other objects, there has been provided, in accordance with the present invention, a signal modulator having a pair of transistors. The transistors have their bases connected together and their collectors connected in series with a source of an alternating current signal and a load for the source. The collector-base diodes of the transistors, in other words, are connected in a series circuit with the source and the load. The emitters of the transistors are connected together and to one of a pair of input signal terminals. The other input signal terminal is connected to the common connection of the bases of the transistors. The input signal is applied to the transistors to vary the impedance of the aforesaid collector-base diodes in order to control the amplitude of the signal supplied to the load by the alternating current signal source.

A better understanding of the present invention may be had from the following detailed description when read in connection with the accompanying drawings, in which.

Figure 1:
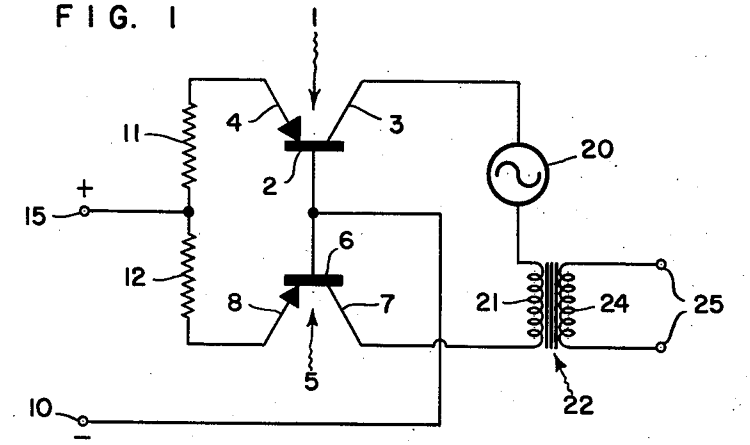
FIG. 1 is a schematic illustration of a signal modulator embodying the present invention.

Referring to FIG. 1, in more detail, there is shown a signal modulator having a first PNP transistor 1 having a base 2, a collector 3, and an emitter 4, and a second PNP transistor 5 having a base 6, a collector 7 and an emitter 8. The bases 2 and 6 are connected together with this common connection being connected to a first input terminal 10. The emitters 4 and 8 are also connected together by a first resistor 11 and a second resistor 12 arranged in series. The series junction between the resistor 11 and 12 is connected to a second input terminal 15.

The collector 3 of the first transistor 1 is connected to one side of an alternating-current source 20 which may be a secondary winding of a power transformer. The other side of the source 20 is connected to one end of a primary winding 21 of a transformer 22. The other end of the primary winding 21 is connected to the collector 7 of the second transistor 5. The primary winding 21 is effective to act as a load for the source 20. A secondary winding 24 of the transformer 22 is connected to a pair of output terminals 25.

Figure 2:
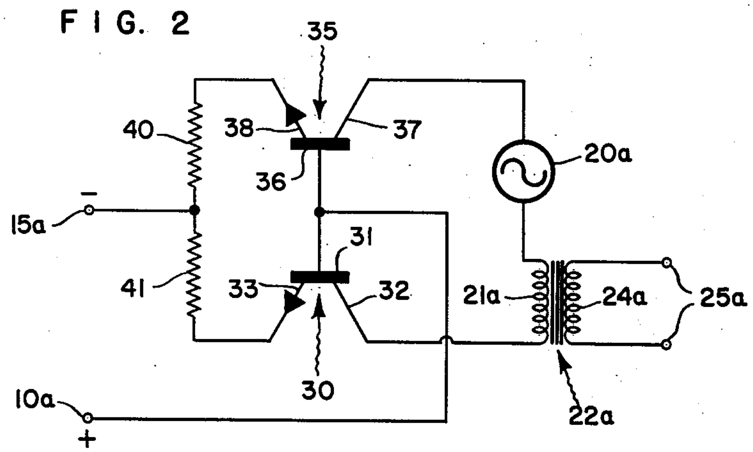
FIG. 2 is a schematic illustration of a modification of the signal modulator shown in FIG. 1 also embodying the present invention.

The circuit shown in FIG. 2 is also an embodiment of the present invention and is arranged for use with NPN transistors. This circuit comprises a first transistor 30 having a base 31, a collector 32 and an emitter 33, and a second transistor 35 having a base 36, a collector 37 and an emitter 38. The bases 31 and 36 are connected together with this common connection being connected to a first input terminal **10*a*. The emitters 33 and 38 are connected together by a pair of resistors 40 and 41 arranged in series. The common connection between these two resistors is connected to the second input terminal 15**.

The collector 37 of the second transistor 35 is connected through an alternating current source **20*a* and a primary winding 21*a* of a transformer 22*a* to the collector 32 of the first transistor 30. A secondary winding 24*a* of the transformer 22*a* is connected to a pair of output terminals 25*a***.

In operation, the present invention is controlled by the application of a direct current control signal to the pair of input terminals 10 and 15. This control signal is applied to the emitter-base diode of each of the transistors 1 and 5. The resistors 11 and 12 are selected to achieve an input signal division whereby the effect of the input signal applied to the emitter-base diode of the first transistor 1 is similar to that applied to the emitter-base diode of the second transistor 5. In other words, this signal division is effective to similarly affect the operation of each of the transistors 1 and 5.

The source 20 is effective to supply the collector current for the transistors 1 and 5 through the primary winding 21. Thus, the impedance of the collector-base diodes of the transistors 1 and 5 is effective to determine the amplitude of the signal applied to the primary winding 21 and the output terminals 25. As previously mentioned, the input signal applied to the input terminals 10 and 15 is effective to control the impedance of the collector-base diode of each transistor 1 and 5. However, since the source 20 is an alternating-current source, the collector-base diodes are instantaneously biased in opposite directions. For example, assume the instantaneous polarity of the source 20 is such as to make the collector 3 of the first transistor 1 negative with respect to the base 2 thereof. This polarity is also effective to make the collector 7 of the second transistor 5 positive with respect to the base 6 thereof.

In the case of a PNP transistor, the polarity necessary to reverse bias the collector-base diode is one which makes the collector negative with respect to the base. The polarity which places the collector at a positive polarity with respect to the base is effective to bias the collector-base diode in a forward direction. The forward biased diode is essentially a short circuit for the bias signal while the reverse biased diode is a high impedance for the bias signal.

The collector-base diodes of the transistors 1 and 5 are serially connected in an opposed manner; i.e., with similar diode elements connected together. Accordingly, a single polarity of a bias signal is effective to forward bias one diode and to reverse bias the other diode. Thus, at any instant, the polarity of the source 20 is effective to reverse bias one collector-base diode and to forward bias the other collector-base diode. The forward biased diode is a short circuit for the source 20, and the reverse biased diode is a high impedance for the source.

In the aforesaid example, the source 20 has an instantaneous polarity which is effective to reverse bias the collector-base diode of the first transistor 1 and to forward bias the collector-base diode of the second transistor 5. The collector-base diode of the second transistor 5 is a short circuit for the source 20 while the collector-base diode of the first transistor 1 is a high impedance. As previously discussed, the input signal applied to the input terminals 10, 15 is effective to control the impedance of the collector-base diodes of the transistors 1, 5. Since the collector-base diode of the second transistor 5 is a short circuit, the input signal has no effect on the impedance thereof. In the case of the high impedance presented by the reverse biased collector-base diode of the first transistor 1, the input signal is effective to determine the value of this impedance in accordance with the magnitude of the input signal applied to the first transistor 1. Thus, the amplitude of the output signal appearing at the output terminals 25 is determined by the magnitude of the input signal.

Similarly, when the source 20 undergoes a reversal of polarity from that used in the above example, the collector-base diodes exchange their aforesaid bias conditions. Accordingly, the collector-base diode of the first transistor 1 is forward biased and is a short circuit to the bias signal from the source 20. The collector-base diode of the second transistor 5 is reverse biased and is a high impedance. However, in this case, the impedance of collector-base diode of the second transistor 5 is still determined by the magnitude of the same input signal which affected the first transistor 1. Since the effect of the input signal on the transistors 1 and 5 is arranged to be similar by the selection of the resistors 11 and 12, the level of the output signal for the new polarity of the source 20 is the same as the previous level. The operation of the modulator is effective to produce an alternating current output signal on the terminals 25 having a similar amplitude on both polarities with the amplitude determined by the magnitude of the input signal applied to the input terminals 10 and 15.

The operation of the modulator shown in FIG. 2 is similar to that described above with reversal of the polarities required by the collector-base diodes to achieve the same result and a reversal of the input signal polarity to control the collector-base impedance. These changes are the result of a substitution of NPN transistors for the PNP transistors used in FIG. 1. The description of the operation of the device shown in FIG. 1 is applicable here with the aforesaid reversal in the effect of the polarities of the source 20.

Accordingly, it may be seen that there has been presented, in accordance with the present invention, a signal modulator for converting a direct-current input signal to an alternating-current output signal having its amplitude proportional to that of the input signal.

What is claimed is:

1. A signal modulator consisting of a first transistor, a second transistor, means connecting together the base electrodes of said first and said second transistors, a source of alternating-current signals, a load means, circuit means connecting said source and said load in series between the collector electrodes of said first and said second transistors, a pair of input terminals arranged to be connected to a source of a direct-current control signal, and input circuit means connecting the emitter electrodes of said first and said second transistors to each other and to one of said pair of input terminals and connecting said base electrodes to the other of said input terminals whereby to apply an input signal between the base electrode and emitter electrode of each of said transistors said input means including input signal dividing resistors connected to divide an input signal applied to said input terminals equally between said first and said second transistor.

2. A signal modulator as set forth in claim 1 wherein said first and said second transistors are each NPN transistors.

3. A signal modulator as set forth in claim 1 wherein said first and said second transistors are each PNP transistors.

4. A signal modulator consisting of a first transistor, a second transistor, means connecting together the base electrodes of said first and second transistors, an energizing signal input means arranged to be connected to a source of energizing signals, a load means, circuit means connecting said load and said energizing signal input means in series between the collector electrodes of said first and second transistors, a pair of input terminals arranged to be connected to a source of a direct-current control signal, and input circuit means connecting the emitter electrodes of said first and said second transistors to each other and to one of said pair of input terminals and connecting said base electrodes to the other of said input terminals whereby to apply an input signal between the base electrode and emitter electrode of each of said transistors said input means including input signal dividing resistors connected to divide an input signal applied to said input terminals equally between said first and said second transistor.

References Cited in the file of this patent

UNITED STATES PATENTS 2,846,652 Cluwen ---------------- Aug. 5, 1958